(12) United States Patent
Uchiyama

(10) Patent No.: US 7,438,232 B2
(45) Date of Patent: Oct. 21, 2008

(54) TWO-DIMENSIONAL CODE AND INFORMATION PROCESSING METHOD

(75) Inventor: Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 11/257,786

(22) Filed: Oct. 25, 2005

(65) Prior Publication Data

US 2006/0091215 A1  May 4, 2006

(30) Foreign Application Priority Data

Oct. 29, 2004 (JP) ............... 2004-315842

(51) Int. Cl.
*G06K 7/10* (2006.01)

(52) U.S. Cl. ............... 235/462.1; 235/462.01; 235/462.16; 235/494

(58) Field of Classification Search ............ 235/462.09, 235/462.1, 462.16, 494
See application file for complete search history.

(56) References Cited

U.S. PATENT DOCUMENTS

| | | | | |
|---|---|---|---|---|
| 5,126,542 A | * | 6/1992 | Priddy et al. ................. | 235/456 |
| 5,612,524 A | * | 3/1997 | Sant'Anselmo et al. ..... | 235/494 |
| 6,181,839 B1 | * | 1/2001 | Kannon et al. ............... | 382/312 |
| 6,267,296 B1 | * | 7/2001 | Ooshima et al. ............. | 235/487 |
| 6,429,951 B1 | * | 8/2002 | Kiuchi et al. ................. | 358/1.9 |
| 6,456,798 B1 | * | 9/2002 | Keech et al. ................. | 396/311 |
| 6,752,316 B2 | * | 6/2004 | Mizoguchi ............. | 235/462.09 |
| 6,802,454 B1 | * | 10/2004 | McMurtry et al. .......... | 235/494 |
| 6,814,291 B1 | * | 11/2004 | Cordery et al. ........ | 235/462.25 |
| 6,863,218 B2 | * | 3/2005 | Muramatsu ............ | 235/462.25 |
| 6,866,199 B1 | * | 3/2005 | Keech et al. ................. | 235/490 |

OTHER PUBLICATIONS

Zhang, et al., "Visual Marker Detection and Decoding in AR Systems: A Comparative Study," Proc. of International Symposium on Mixed and Augmented Reality (ISMAR' 02) 2002.

* cited by examiner

*Primary Examiner*—Ahshik Kim
(74) *Attorney, Agent, or Firm*—Canon U.S.A., Inc., I.P. Division

(57) ABSTRACT

A two-dimensional code has an external shape which can be distinguished from the background by brightness or color, with an interior region, positioned a predetermined spacing away from the perimeter thereof, being divided into a plurality of smaller areas of a predetermined size, and information being represented by the brightness or color of each of the divided regions, wherein the size of each of the areas is greater than approximately twice the size of the spacing. This solves the problem that the outer square shape of two-dimensional code can be recognized but the inner bits cannot be read out with certainty.

11 Claims, 8 Drawing Sheets

VERICODE

TWO-DIMENSIONAL CODE AND INFORMATION PROCESSING METHOD

BACKGROUND OF THE INVENTION

1. Field of the Invention

The present invention relates to the configuration of two-dimensional code which can be detected from an image, and to a method and device for detecting two-dimensional code from an image.

2. Description of the Related Art

A two-dimensional code, in which a two-dimensional region is sectioned according to a certain rule and information is expressed by the brightness/darkness of each of the section regions, is known. Normally, such code is captured with a camera, the two-dimensional code is distinguished and detected from the background, and information is read out based on the brightness of each sectioned region appropriated therein. Various forms of two-dimensional code are known as conventional art, and the two-dimensional code shown in FIGS. 9 and 10 is a type thereof. This two-dimensional code will hereafter be referred to as "two-dimensional code 1".

The two-dimensional code has an external shape of a square which is darker than a bright background, and the interior thereof starting from a predetermined spacing from the frame is divided into small squares, thus expressing bits by the brightness/darkness of the squares.

Also, in the field of mixed reality wherein a virtual space is displayed so as to be merged with real space, square markers disposed in the real space are used as a way to estimate the position and orientation of cameras in the real space. The demand for positioning multiple square markers in real space has brought about a proposal for square markers each of which have individual ID information within the square so as to enable each square to be identified uniquely. Examples of the method disclosed in X. Zhang, S. Fronz, N. Navab: "Visual Marker Detection and Decoding in AR systems: A Comparative Study," Proc. of International Symposium on Mixed and Augmented Reality (ISMAR' 02) 2002 (hereinafter "Zhang et al.") include the marker 1 shown in FIG. 12 and the marker 2 shown in FIG. 13.

The marker 1 is of a configuration wherein a large square of which the interior is sectioned into small squares, and several small squares along one side of the large square, are arranged. The structure of the interior of the large square is the same as that of the two-dimensional code 1 in the above-described related art, the interior being equally divided into small squares with a certain spacing between the outer frame of the square and the interior thereof. Bits can be represented by the brightness/darkness of each in the squares on the interior. The marker 1 also has a region of small squares on the outside of the large square, which is used for determining the reference side of the square, that is to say the direction of rotation of the square. Also, in addition to the direction of rotation, other types of information can be represented by the relative position between the small squares positioned outside as to the large square, and the number thereof.

The marker 2 is the same as described in Zhang et al. and the two-dimensional code 1 and marker 1 described above regarding the fact that the shape is a square which is darker than a bright background. The point that differs is the shape of the regions for assigning bits within the square; with this marker, circular regions are used. However, the fact remains that regions are appropriated as to the interior region of a square, with a certain spacing between the outer frame of the square and the interior thereof, albeit circles.

The two-dimensional code 1, marker 1, and marker 2, described as related art, are each based on the same technique of having an external shape of a square which is darker than a bright background, and the interior thereof starting from a predetermined spacing from the frame is equally divided into sections, thus expressing bits by the brightness/darkness of the sectioned regions.

Now, the predetermined spacing between the square which is the outer shape, and the interior region thereof, is set so as to be the same as or larger than the size of each of the sectioned regions into which the interior has been sectioned for the purpose of carrying information. The case of the two-dimensional code 1, for example, will be described with reference to FIG. 11. The symbol d1 in FIG. 11 represents the spacing provided between the outer shape square and the interior bit region. On the other hand, d2 represents the length of one side of each of the interior bit squares. As can be understood from this drawing, d1 is set so as to be longer than d2. Also, the marker 1 will be described in the same way with reference to FIG. 14. As with the case above, d1 in FIG. 14 represents the spacing provided between the outer shape square and the interior bit region, and d2 represents the length of one side of each of the interior bit squares. In the case of the marker 1, d1 and d2 are equal. Hereinafter, the two-dimensional code 1, marker 1, and marker 2 will be collectively referred to as "two-dimensional code".

As can be understood so far, with the two-dimensional code of the related art, the relationship between the spacing d1 between the outer shape square and the interior bit region, and the length d2 of one side of each of the interior bit squares, is $d1 \geq d2$.

With the two-dimensional code of the related art, there is a discrepancy between the minimum size of the two-dimensional code at which the outer shape can be recognized, and the minimum size of the two-dimensional code at which the inner bit region can be read. That is to say, the sizes d1 and d2 have not been optimized.

Accordingly, there has been the problem that while the square outer shape of the two-dimensional code can be recognized, the interior bits could not be read out with a high degree of accuracy. From the opposite perspective, with the minimum size at which the interior bits can be read out, the space between the outer frame and the interior region that is necessary for recognizing the outer shape is excessively great, meaning that the area of the two-dimensional code in the image is too great.

SUMMARY OF THE INVENTION

The present invention has been made in light of the above problems, and provides two-dimensional code which solves the above-described problems.

According to a first aspect of the present invention, a two-dimensional code has an external shape having a predetermined width which can be distinguished from the background by brightness or color, and an interior region, which is divided into a plurality of smaller areas of a predetermined size, and information being represented by the brightness or color of each of the divided regions. The size of each of the areas is greater than approximately twice the size of the predetermined width.

According to a second aspect of the present invention, an information processing method detects two-dimensional code having an outer frame region and an information region having a plurality of areas from an image and acquires information shown in the information region. The information processing method includes: acquiring of captured image data; detecting from the captured image data of a region having a shape corresponding to the geometric shape of the two-dimensional code; and acquiring image information of the plurality of areas within the detected region. The size of each of the areas is greater than approximately twice the width of the width of the outer frame.

According to a third aspect of the present invention, an information processing method, which uses a two-dimensional code having a polygonal external shape of a predetermined width which can be distinguished from the background by brightness or color, with an interior region being divided into a plurality of smaller areas of a predetermined size, and information being represented by the brightness or color of each of the divided regions. The information processing method includes: detecting a polygonal shape of the external shape of the two-dimensional code based on brightness or color; reading out of pixel values for the brightness or color at the position in an image of each of the areas, based on the polygonal shape detected; and converting information of the brightness or color read out in reading out of pixel values into binary or higher-valued information. The size of each of the areas is greater than twice the predetermined width of the outer frame.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

First Embodiment

A method including the following two procedures is used as the method for detecting two-dimensional code from an image. One procedure is a procedure for detecting an outer square shape from a background, and another procedure is a procedure for positioning the internal bit regions with the detected outer square as a reference, and reading out the brightness thereof. The reason why spacing is provided between the outer square shape and the inner bit regions is that this is necessary for the first step of the two, wherein an outer square shape is detected from the background. More specifically, this is for detecting the outer square shape from the background regardless of what sort of values the information represented by two-dimensional code carries. The information represented by the two-dimensional code is expressed by coloration of the bit regions into bright (i.e., white) parts and dark (i.e., black) parts, so the brightness of the internal regions can assume various patterns. In order to detect the dark square shape which represents the entire two-dimensional code from a bright background, sufficient width between the internal bit regions with indeterminate brightness and the outer frame is necessary.

Now, the spacing between the outer frame and the bit regions, and the size of each of the inner bit regions, are determined based on a size which is recognizable from the image. The recognizable size is determined based on the size of the two-dimensional code in the image, and the resolution of the image to be taken.

First, the method for detecting the square from the background will be described with reference to FIGS. 5A through 5D. The requirements for the spacing between the outer frame and the inner bit region will be described thereafter.

Figure 5A:
FIGS. 5A through 5D are diagrams illustrating a method for detecting the external square shape of two-dimensional code.
Figure 5B:
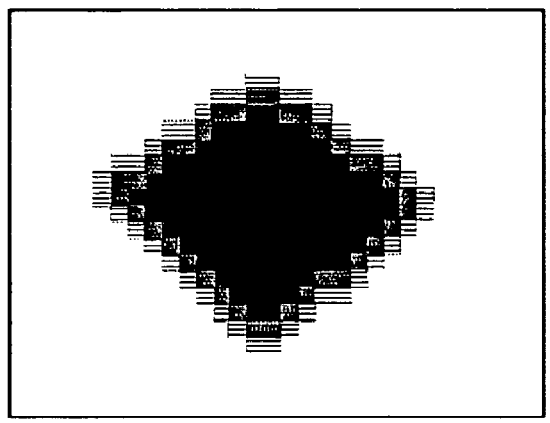

FIG. 5A illustrates a square which is all black inside as well. This black square is a marker disposed on a white background. Capturing a scene in which this marker is disposed with a camera yields a result such as shown in FIG. 5B. The reason why the square is generally observed as such a tilted square as shown in the drawing is that first, the camera is not necessarily positioned so as to perfectly match the orientation of the square, and second, the horizontal and vertical axes of the image do not necessarily match the sides of the square. Moreover, the image is configured of pixels, which are small regions into which the image is sectioned in a grid-like form, so as shown in FIG. 5B, the boundary portion between the square shape shown in FIG. 5A and the background is observed as a grayish mixture of the black of the square and the white of the background.

Figure 5C:
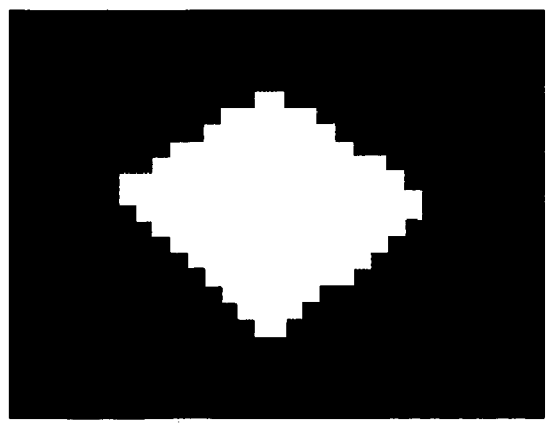
Figure 5D:
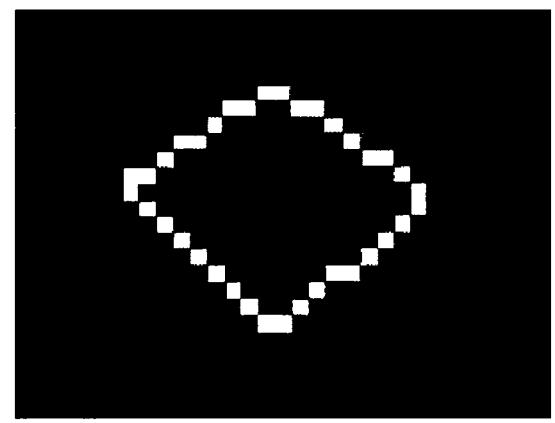

In order to detect the square shape from an image such as shown in FIG. 5B, the image is binarized based on brightness as shown in FIG. 5C, and the pixels on the boundary which is a continuous region in the obtained binary image extracted as in FIG. 5D. Note that while a method has been described here for binarizing the image in FIG. 5B to obtain pixels on the boundary, a method may be used wherein the pixels on the boundary are obtained by subjecting the image in FIG. 5B to edge detection processing.

Upon approximating the pixels on the obtained boundary with a polygonal line, in the event that four corners and straight lines connecting the four corners can be sufficiently approximated, the shape can be determined to be a square.

The description made so far has been regarding that of a method for detecting a square, which is completely black inside, from an image, with reference to FIGS. 5A through 5D. Even in the event that there is a white region within the square shown in FIG. 5A, the square can still be detected as long as continuous pixels forming a perimeter can be obtained as shown in FIG. 5D. That is to say, as long as the spacing between the outer frame of the square and the internal white region has a width of one pixel or more in the captured image, the square shape can be detected.

In terms of the outer frame and inner bit regions of the two-dimensional code, this means that the spacing therebetween needs to be designed with consideration given to being a size of one pixel or greater when being captured as an image.

Next, the requirements for the size of each of the internal bit regions of the two-dimensional code will be described. In the event that the size of a bit region in the image taken is smaller than one pixel, the adjacent bit region will be mixed into the same pixel, meaning that detection thereof is impossible. That is to say, the size of each bit region must be at least one pixel or grater when the two-dimensional code is captured as an image. However, having a size of one pixel or greater does not guarantee detection. This will be described in further detail with reference to FIGS. 6 through 8B.

Figure 6:
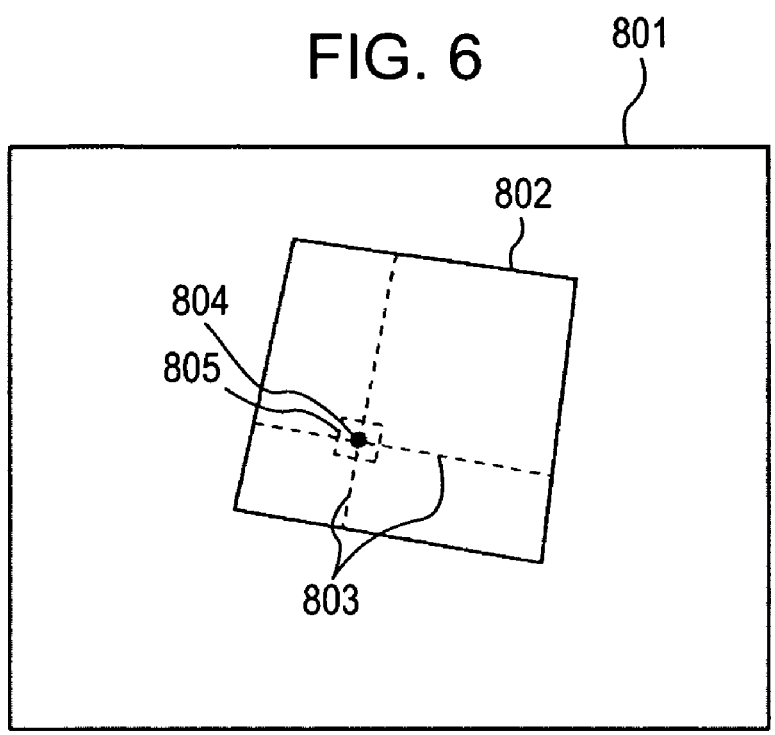
FIG. 6 is a diagram illustrating the detection results of a square shape on an image, which is the external square shape of two-dimensional code, and that the internal bit region thereof can be determined based on the detection results.

FIG. 6 illustrates a partial image 801 in which a part of an image of a captured two-dimensional code has been enlarged. Let us say that as a result of detecting the square outer shape of the two-dimensional code from the background in the image that has been taken, a square 802 has been detected. This is obtained by linear approximation of the portions corresponding to each of the four sides from the array of pixels on the boundary line of the square detected as shown in FIG. 5D.

The position of an internal bit region (center position thereof) is obtained based on the square shape 802. For example, let us say that the position of one bit region therein is calculated as having the center point thereof at the point 804. The position of the bit region in the captured image can be calculated based on the physical position of the bit region in the two-dimensional code. For example, the position of the bit region in the captured image can be obtained as the intersection of two straight lines 803 obtained by dividing the sides of the square 802 by a certain ratio, using the physical position of the bit region in the two-dimensional code. Also, a method can be used in which two-dimensional projective transformation (planar homography) is calculated from the correlation between the apices of the square 802 and physical square apices, and the obtained planar homography is employed. Moreover, the position on the image of the small square 805, which is the bit region, can be calculated by a similar method.

Figure 7:
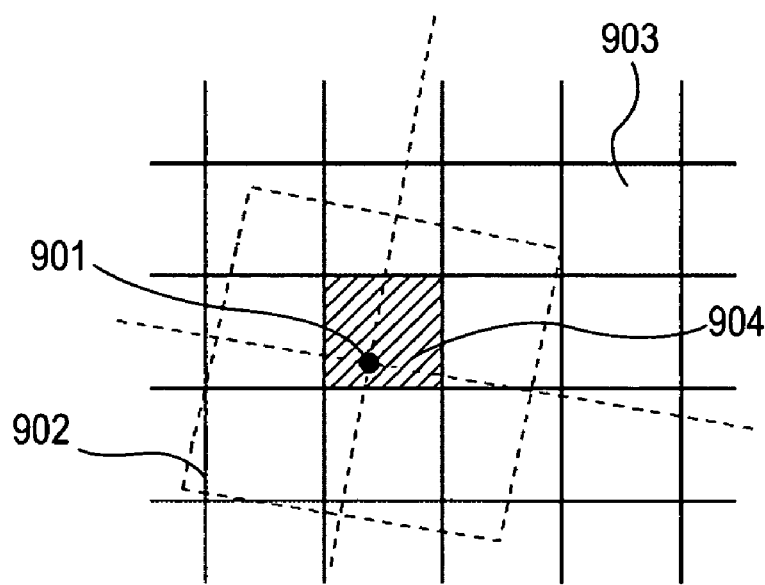
FIG. 7 is a diagram illustrating obtaining the brightness of the internal bit region by the nearest neighbor method.

The brightness value of the center point 804 of the obtained bit region is obtained based on the pixel values of the image obtained by capturing the two-dimensional code. FIG. 7 is a diagram in which the proximity of the point 804 shown in FIG. 6 has been enlarged. Reference numeral 901 denotes the point 804 in FIG. 6, i.e., represents the center point of the bit region. Reference numeral 902 denotes the square 804 in FIG. 6, i.e., represents the position of the small square which is a single bit region in the image. Pixels 903 making up the image are grid-shaped regions which cover the entire image, with the pixel values representing the average color and/or brightness within each region. The center position of each pixel region of the grid can be considered to be the position of that pixel. Now, of the array of pixels 903, the pixel at the position closest to the point 901 is taken, and the point 901 is considered to have the same color and brightness as that pixel. That is to say, the brightness value of the point 901 is obtained based on the value of the pixel shown at the position 904. This method is a method for using the pixel nearest to the center point of the bit region, and is also called the "nearest neighbor" method.

Figure 8A:
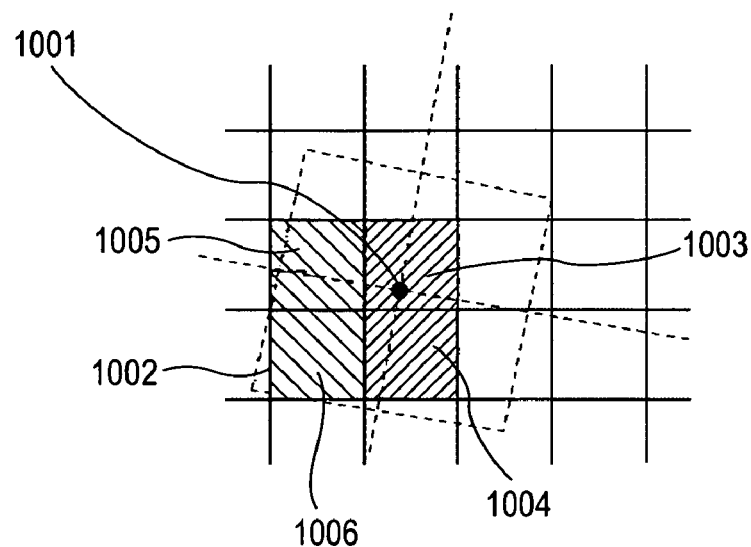
FIGS. 8A and 8B are diagrams illustrating obtaining the brightness of the internal bit region by interpolation from the pixel values of the four nearest pixels.
Figure 8B:
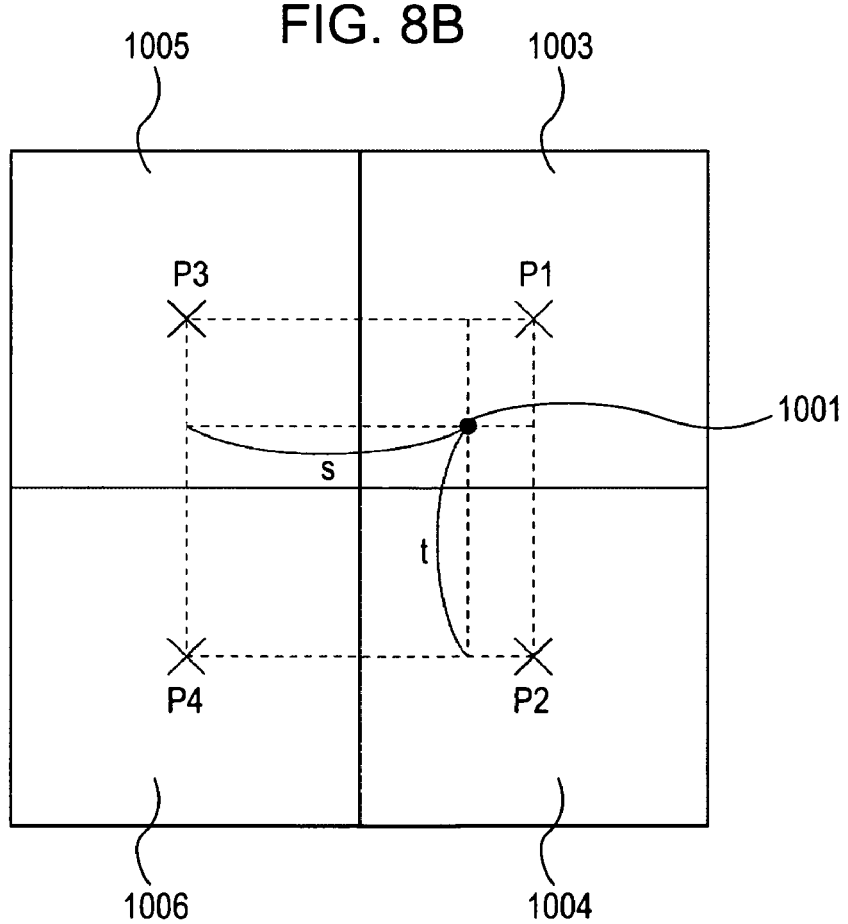
Figure 9:
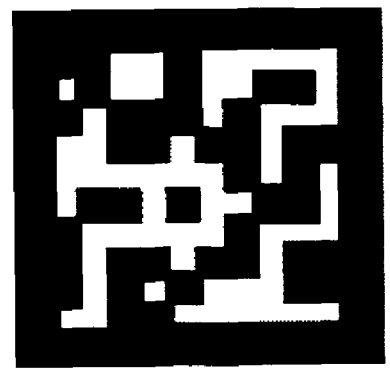
FIG. 9 is an example of a two-dimensional code according to the related art.
Figure 10:
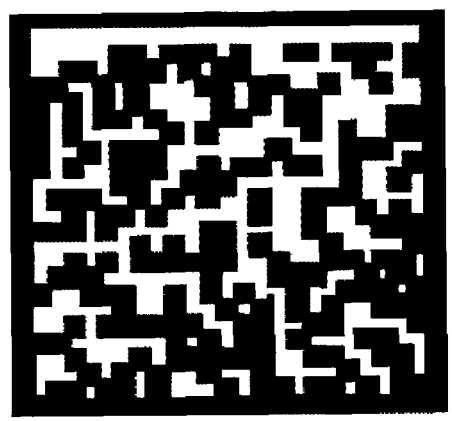
FIG. 10 is another example of a two-dimensional code according to the related art.
Figure 11:
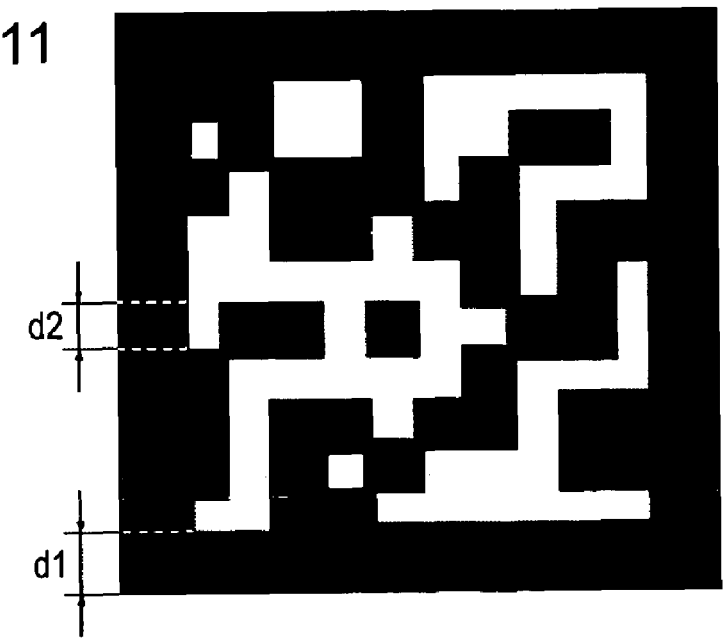
FIG. 11 is a diagram illustrating the relation in size between: the spacing between the outer frame and internal bit region of the two-dimensional code according to the related art, and the size of internal bit areas therein.
Figure 12:
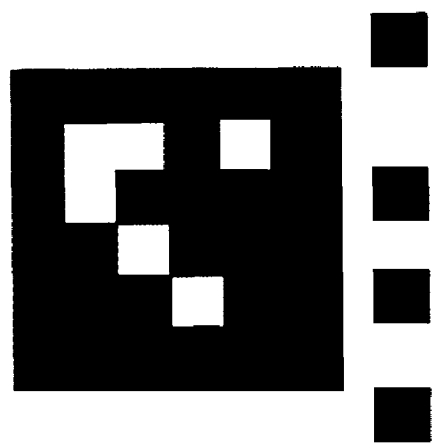
FIG. 12 is a diagram illustrating an example of a marker based on a square shape used in the related art, which is a type of two-dimensional code.
Figure 13:
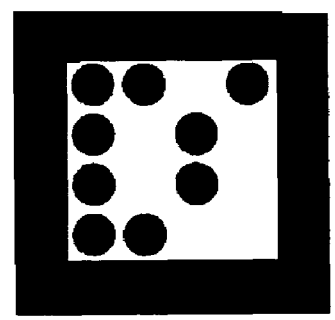
FIG. 13 is a diagram illustrating another example of a marker based on a square shape used in the related art, which is a type of two-dimensional code.
Figure 14:
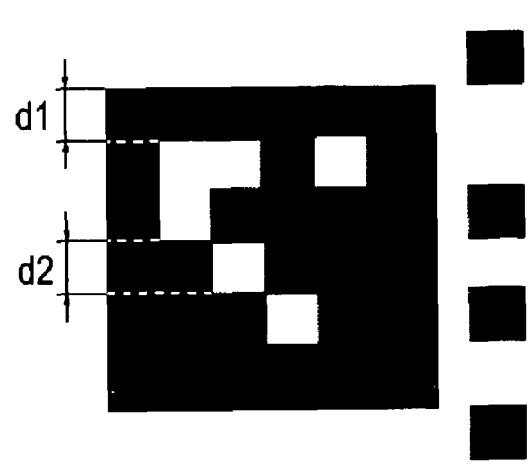
FIG. 14 is a diagram illustrating the relation in size between: the spacing between the outer frame and internal bit region of the two-dimensional code shown in FIG. 12, and the size of internal bit areas therein.

Another method is to obtain the brightness of bit regions with the method shown in FIGS. 8A and 8B. Reference numeral 1001 in FIG. 8A denotes the center point of the bit region, in the same way as with reference numeral 804, and 1002 denotes a small square 805 which is a bit region. Representing the position 1001 as (x, y), the pixels within one pixel distance as to each of x and y are the four pixels 1003, 1004, 1005, and 1006. The brightness value of the bit region is obtained based on the pixel values of the four pixels. More specifically, with reference to FIG. 8B, the pixel positions of the pixels 1003, 1004, 1005, and 1006 are shown as P1, P2, P3, and P4, respectively. The x coordinate of the point 1001 is a value obtained by dividing the x coordinates of P3 and P1 by s:1−s, and the y coordinate of the point 1001 is a value obtained by dividing the y coordinates of P4 and P3 by t:1−t. Now, the brightness of the bit region can be obtained by interpolation of the pixel values of these four pixels, using s and t. For example, with the brightness of the pixel value of the pixel 1003, the pixel value of the pixel 1004, the pixel value of the pixel 1005, and the pixel value of the pixel 1006, as v1, v2, v3, and v4, respectively, the brightness v of this bit region can be obtained by bilinear interpolation as:

$$v = t \cdot \{s \cdot v1 + (1-s) \cdot v3\} + (1-t)\{s \cdot v2 + (1-s) \cdot v4\}.$$

Note that this interpolation calculation is not restricted to bilinear interpolation, and may be interpolation based on the distance between the point 1001 and the positions P1, P2, P3, and P4, or may be any other type of interpolation calculation.

According to the processing described above, the brightness of the bit region can be obtained. However, regardless of the method, the size of the bit region on the image, i.e., the size of the square denoted by 902, must have a width of two pixels or more for the brightness thereof to be detected with certainty. That is because unless the square 902 shown in FIG. 7 has a size of twice or more that of the pixel width, the brightness of a pixel outside the bit region will be used at the time of selecting the nearest pixel. In the same way, unless the square 1002 shown in FIGS. 8A and 8B has a size of twice or more that of the pixel width, bilinear interpolation calculation is performed using the pixel value of pixels having their center outside of the square 1002, meaning that a brightness value for the point 1001 cannot be obtained with certainty.

As described above, while the spacing between the outer frame of the two-dimensional code internal bit regions can be detected as long as the width thereof is one pixel or greater in the image taken, brightness values for the internal bit regions cannot be obtained with certainty unless the width thereof is two pixels or more.

In comparison with this, the two-dimensional code in the related art has the spacing d1 between the outer face and the inner bit regions and the internal bit region size d2 in a relationship of d1≧d2, as described earlier. That is to say, in a case of a small image wherein the spacing between the outer face and the inner bit regions is shown at around one pixel in width in the image, the square outer shape of the two-dimensional code can be recognized, but the internal bits cannot be read out with certainty, which is a problem with the related art. From a different perspective, there is a discrepancy between the minimum size of the two-dimensional code at which the outer shape can be recognized, and the minimum size of the two-dimensional code at which the inner bit region can be read. Based on the minimum size at which the interior bit regions can be read out, the spacing between the outer frame and the interior region that is necessary for recognizing the outer shape is excessively great, meaning that the area of the two-dimensional code in the image is too great.

Now, an embodiment of two-dimensional code which has solved the problems of the two-dimensional code according to the related art, a configuration example of a two-dimensional code detecting device, and processing procedures, will be described.

Figure 1A:
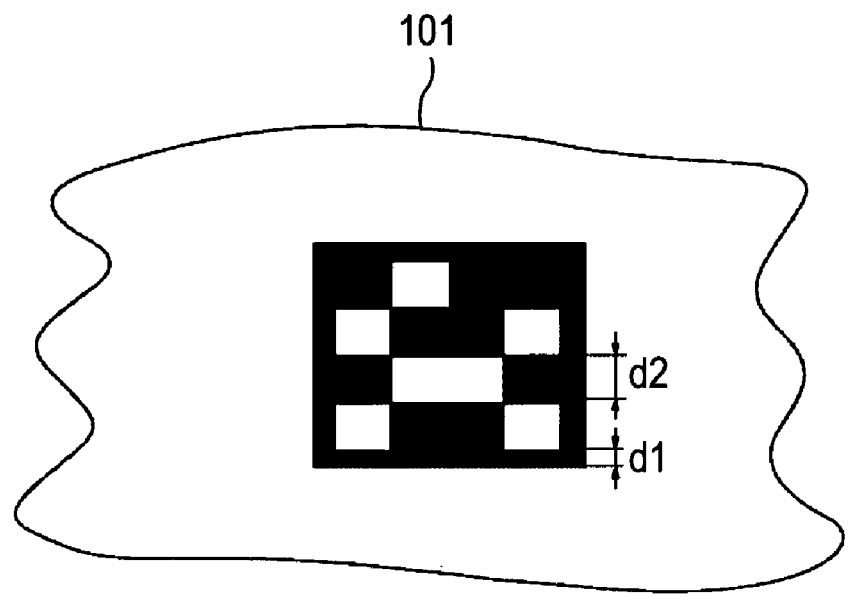
FIGS. 1A and 1B are configuration diagrams of a two-dimensional code according to a first embodiment of the present invention.
Figure 1B:
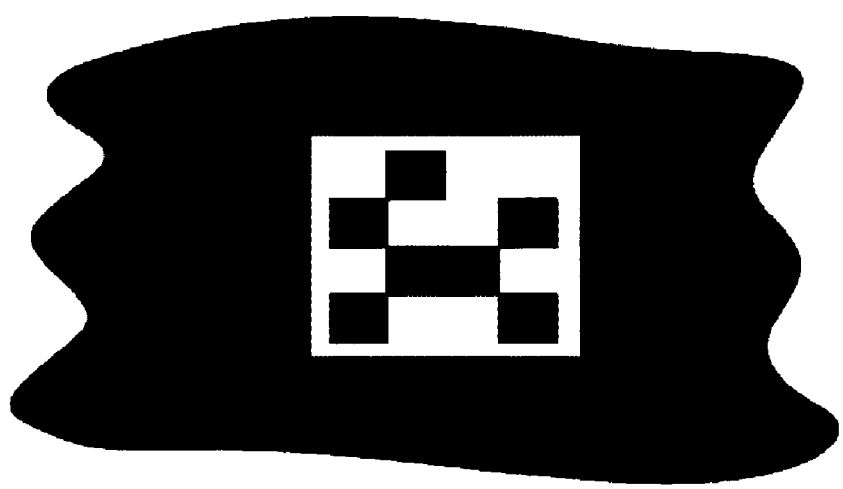

FIGS. 1A and 1B show an embodiment of two-dimensional code. FIG. 1A shows a white background 101 which is the background of the two-dimensional code, with the two-dimensional code having a black square outer shape being formed thereupon. A region for representing bits is provided therein, a distance d1 inwards from the outer frame. The inner region for representing bits is divided into n by n regions, with the length of each side of each region being d2. Further, the relationship d2=2×d1 holds. With the inner regions representing bits, white represents "1" and black represents "0". Alternatively, an arrangement could be made wherein white represents "0" and black represents "1."

Also, an arrangement may be made wherein, as with FIG. 1B, a black background serves as the background of the two-dimensional code, with the two-dimensional code having a white square outer shape being formed thereupon, and a region for representing bits being provided therein, a distance d1 inwards from the outer frame. Further, the internal regions are not restricted to binary representation of white or black, and instead may have n values of different brightness so as to represent n states, or may be colored with m colors so as to represent m states.

Figure 2A:
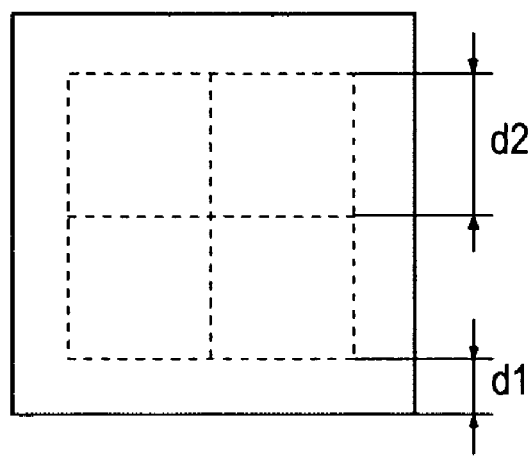
FIGS. 2A through 2C are further configuration diagrams of the two-dimensional code according to the first embodiment.
Figure 2B:
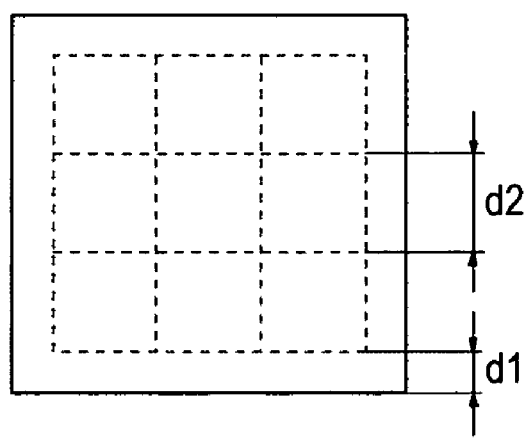
Figure 2C:
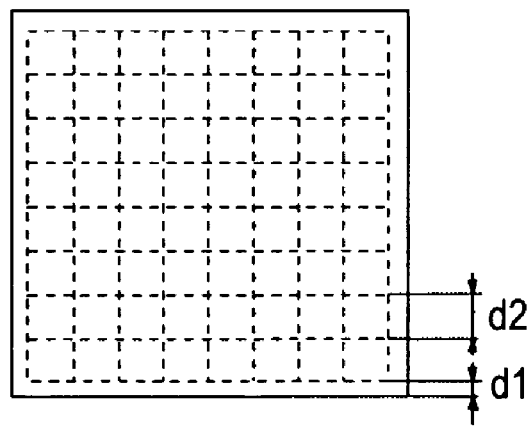

While FIGS. 1A and 1B show the n by n internal divisions being 4 by 4 divisions, the number of divisions is not restricted, as illustrated in FIGS. 2A through 2C. FIG. 2A illustrates a case of 2 by 2 divisions, FIG. 2B a case of 3 by 3 divisions, and FIG. 2C a case of 8 by 8 divisions. In any case, the ratio between the size of the spacing between the outer frame and inner bit region of the two-dimensional code, and the size of the internal bit regions, is 1:2.

Further, while d2=2×d1 holds in FIGS. 1A and 1B, d2 is not restricted to be precisely twice d1. A size approximately twice (e.g., 2.1 times) is sufficient.

Figure 3:
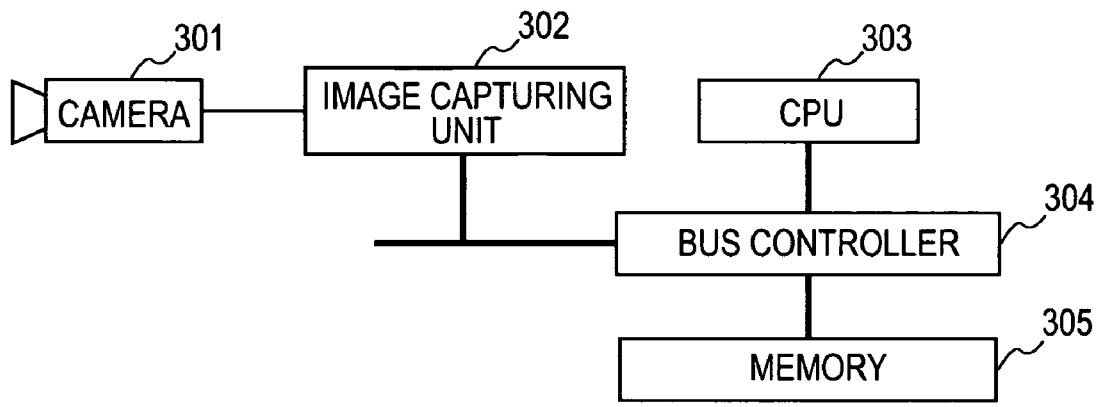
FIG. 3 is a block diagram illustrating a two-dimensional code detecting device according to the first embodiment.

Next, a configuration example of a two-dimensional code detecting device for detecting the two-dimensional code shown in FIGS. 1A and 1B is shown in FIG. 3 by way of a block drawing.

FIG. 3 shows a camera 301 for imaging the two-dimensional code shown in FIGS. 1A and 1B. The image taken is written to memory 305 via an image capturing unit 302 under arbitration of a bus controller 304. The memory 305 stores the processing procedures according to the present embodiment, to be carried out by a central processing unit (CPU) 303. The bus controller 304 arbitrates data input/output between the CPU 303, image capturing unit 302, and memory 305.

Figure 4:
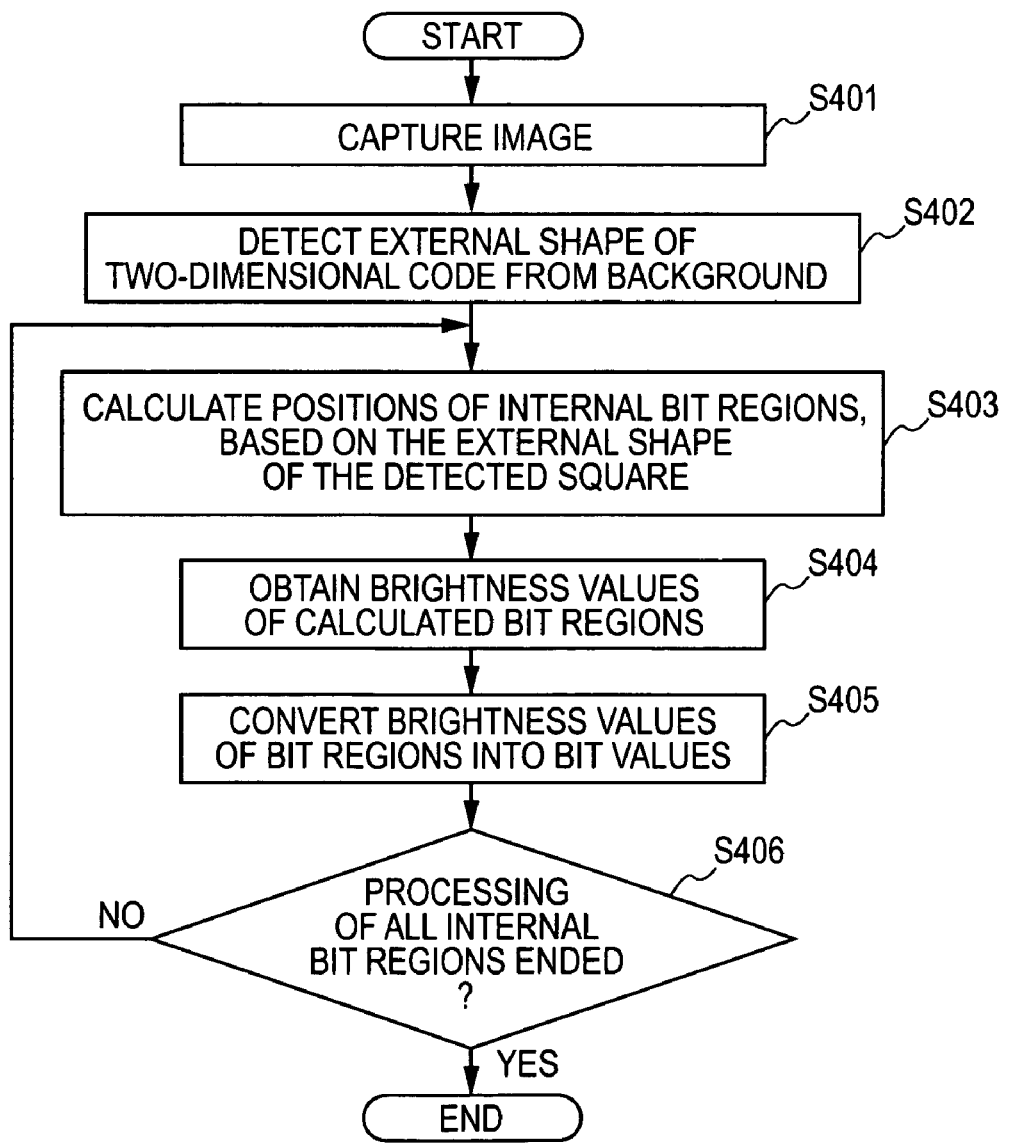
FIG. 4 is a flowchart illustrating the processing which the two-dimensional code detecting device according to the first embodiment performs.

FIG. 4 is a flowchart illustrating the processing procedures of the two-dimensional code detecting device of which configuration is shown in FIG. 3. The processing procedures will be described with reference thereto.

First, in step S401, the two-dimensional code shown in FIG. 1A or 1B is taken with the camera 301, and the taken image is captured by the image capturing unit 302. In step S402, a square shape, which is the outer shape of the two-dimensional code, is detected from the image. More specifically, the image which has been taken is binarized, the pixels on the boundary which is a continuous region are extracted, and determination is made regarding whether or not four corners and straight lines connecting the four corners can be approximated by approximating the pixels on the boundary with a polygonal line. In the event that sufficient approximation can be made, the square is detected by linear approximation of the pixels corresponding to each of the four sides. At this time, the pixels on the boundary may be extracted by performing edge detection instead of extracting pixels on the boundary which is a continuous region by binarization.

In step S403, the position of a certain inner bit region is calculated based on the detected square outer shape. As shown in FIG. 6, the position of the bit region can be obtained as the intersection of two straight lines 803 obtained by dividing the sides of the square 802 by a certain ratio, using the physical position of the bit region in the two-dimensional code, or two-dimensional projective transformation (planar homography) can be calculated from the correlation between the apices of the square 802 and physical square apices, and the obtained two-dimensional projective transformation be employed.

In step S404, the brightness of the bit region is obtained, based on the position of the bit region that has been obtained. This may be obtained by the nearest neighbor method or by bilinear interpolation.

In step S405, the brightness value is converted into a bit value by taking the value to be "1" in the event that the obtained brightness value is greater than a certain threshold value, and "0" otherwise. Alternatively, an arrangement may be made wherein the value is "0" in the event that the obtained brightness value is greater than a certain threshold value, and "1" otherwise. Also, n threshold values may be provided, in order from small brightness value to great brightness value, and the brightness value be converted into n values, with a brightness value smaller than the first threshold value being "0," a brightness value equal to or greater than the first threshold value but smaller than the second threshold value being "1," a brightness value equal to or greater than the n−1'th threshold value but smaller than the n'th threshold value being n−1, and a brightness value equal to or greater than the n'th threshold value being n. In this case, each region does not represent one bit (binary value), and accordingly cannot be referred to as "bit regions" to be precise, but all methods described in the present embodiment can be directly applied thereto by taking these to be inner bit regions for the sake of convenience.

The processing of steps S403 through S405 is repeated until processing is completed for all inner bit regions. In step S406, determination is made regarding whether or not processing has been completed for all inner bit regions; in the event that this has not been completed the flow returns to step S403, otherwise the flow ends.

Thus, according to the present embodiment, detection of two-dimensional code from a captured image is performed using the outer shape features of the two-dimensional code (step S402). The bit regions of the two-dimensional code are then identified based on the brightness of the bit regions (steps S403 through S406).

With the two-dimensional code according to the present embodiment, the size of the spacing between the outer frame and inner bit region of the two-dimensional code and the size of the internal bit regions are optimized based on the features of algorithms for detection and identification thereof.

Accordingly, the inner bit values can be read out with certainty from a two-dimensional code in an image, even in cases in which the spacing between the outer frame and the inner bit regions is around one pixel. That is to say, in a case in which the two-dimensional code can be detected from the captured image based on the outer square, the inner bit values can be read out with certainty. In other words, the probably of cases in which the inner bits are erroneously identified can be reduced.

Modifications

The two-dimensional code according to the first embodiment shown in FIG. 1 may use other polygonal shapes besides a square for the outer shape, such as a rectangle.

Also, while the first embodiment has described the relation between the spacing d1 between the outer frame and the inner bit region, and the size d2 of the inner bit regions, being approximately d2=2×d1, the size d2 may be set larger than 2×d1. Increasing the size of the bit region raises the identification precision of the inner bits. Accordingly, depending on the use, the size of d2 may be greater than twice the size of d1.

Also, the first embodiment describes a method for binarizing into ones and zeroes by determining the brightness of individual bit regions colored either white or black, and a method for converting the bit regions into n values using multiple brightness levels, but an arrangement may be made wherein the bit regions are colored in multiple colors. This arrangement is no different from the above arrangements in that an interpolation method from a close pixel or close pixels such as the nearest neighbor method or bilinear interpolation can be used to acquire the color of each of the regions. The obtained color can be converted into m states by selecting the most certain one from multiple (m) registered candidates. Any method may be used to color each of the internal bits.

The present invention may be realized from a system configured of multiple devices having functions equivalent to those of the two-dimensional code detecting device described in the above embodiment.

The present invention also encompasses arrangements wherein the software program for realizing the functions of the above-described embodiment are supplied to a system or device having a computer capable of executing the program either directly from a recording medium or via cable or wireless communication, such that equivalent functions are achieved by executing the program supplied to the computer of the system or device. In this case, the program is not restricted to any form, such as object code, a program executed by an interpreter, script data supplied to the Operating System, or the like.

Examples of the recording medium for supplying the program include magnetic recording media such as flexible disks, hard disks, magnetic tape, and so forth, optical/magneto-optic recording media such as magneto-optical (MO), compact disk-read-only memory (CD-ROM), CD-recordable (CD-R), CD-rewriteable (CD-RW), digital versatile disk-ROM (DVD-ROM), DVD-R, DVD-RW, and so forth, non-volatile semiconductor memory, and so forth.

Examples of methods for supplying the program via cable/wireless communication include storing, on a server on a network, a data file (program data file) which can serve as the computer program realizing the present invention on a client computer, such as the computer program itself, a compressed and self-extracting file with automatic installation functions, or the like, and downloading the program data file to a client computer which accesses the server. In this case, the program data file may be segmented into multiple segment files, and have the segment files stored on different servers. That is to say, a server device may download the program data file for realizing the function processing of the present invention to multiple users.

Also, an arrangement may be made wherein the program according to the present invention is encrypted and stored in a recording medium such as a CD-ROM and distributed to the user in this state, with key information for decrypting the encryption being downloaded from an Internet homepage, for example, to users which satisfy certain conditions, so that the encrypted program can be executed and installed to the computer using the key information.

Also, in addition to the functions of the above-described embodiment being realized by the program read out being executed on a computer, the functions of the above-described embodiment may be realized by the Operating System running on the computer performing part or all of the actual processing based on instructions of the program.

Moreover, the functions described above may be realized by the program read out from the recording medium being written to memory provided to a function expansion board inserted to the computer or function expansion unit connected to the computer, following which the OS running on the computer performs part or all of the actual processing based on instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-315842 filed Oct. 29, 2004, which is hereby incorporated by reference herein in its entirety.

What is claimed is:

1. A two-dimensional code comprising:
   an external region defined by an external shape, being distinguished from a background by brightness or color, and
   an interior region having a plurality of areas, information of each of the areas being represented by brightness or color of the area;
   wherein a height or width of each of the areas is at least twice a width of the external shape,
   wherein the external region is used for detecting the external shape of the two-dimensional code from a captured image, and
   wherein a position in the captured image for each area of the interior region is calculated based on the detected external shape.

2. A two-dimensional code according to claim 1, wherein the external shape is a square.

3. A two-dimensional code according to claim 1, wherein the shape of the areas is a square.

4. An information processing method for detecting two-dimensional code having an outer frame region and an information region having a plurality of areas, from a captured image, and acquiring information represented by the information region, the information processing method comprising:
   acquiring captured image data representing the captured image;
   detecting a region having a shape corresponding to the geometric shape of the two-dimensional code, from the captured image data;
   calculating a position in the captured image for each of the plurality of areas based on the detected region; and
   acquiring image information of the plurality of areas within the region detected; based on the calculated positions;

wherein, a height or width of each of the areas is at least twice a width of the outer frame.

5. An information processing method according to claim 4, wherein detecting the region comprises:
binarizing the captured image data; and
detecting the boundary of continuous regions from the binarized image data.

6. An information processing method according to claim 4, wherein acquiring image information comprises:
obtaining image information corresponding to physical area position information in the two-dimensional code; and
identifying the information from image information corresponding to each of the plurality of areas.

7. A computer-readable recording medium storing computer-readable instructions for detecting two-dimensional code having an outer frame region and an information region having a plurality of areas, from a captured image, and acquiring information represented by the information region, the computer-readable recording medium comprising:
computer-executable instructions for acquiring captured image data representing the captured image;
computer-executable instructions for detecting a region having a shape corresponding to the geometric shape of the two-dimensional code, from the captured image data;
computer-executable instructions for calculating a position in the captured image for each of the plurality of areas based on the detected region; and
computer-executable instructions for acquiring image information of the plurality of areas within the region detected based on the calculated positions;
wherein, a height or width of each of the areas is at least twice a width of the outer frame.

8. An information processing method for detecting two-dimensional code which can be distinguished from a background by brightness or color, the two dimensional code having an outer frame region defined by an external shape and an interior region having a plurality of areas, information of the areas being represented by brightness or color of the areas, the information processing method comprising:
acquiring captured image data representing a captured image;
detecting a polygonal shape of the external shape of the two-dimensional code based on brightness or color, from the captured image data;
calculating a position in the captured image for each of the plurality of areas based on the detected polygonal shape;
reading out of pixel values for the brightness or color at the calculated position of each of the areas; and
converting information of the brightness or color read out in reading out of pixel values into binary or higher-valued information;
wherein a height or width of each of the areas is at least twice of the outer frame.

9. A computer-readable recording medium storing computer-executable instructions for detecting two-dimensional code which can be distinguished from a background by brightness or color, the two dimensional code having an outer frame region defined by an external shape and having a predetermined width and an interior region having a plurality of areas of a predetermined size, information of the areas being represented by brightness or color of the areas, the computer-readable recording medium comprising:
computer-executable instructions for acquiring captured image data representing a captured image;
computer-executable instructions for detecting a polygonal shape of the external shape of the two-dimensional code based on brightness or color, from the captured image data;
computer-executable instructions for calculating a position in the captured image for each of the plurality of areas based on the detected polygonal shape;
computer-executable instructions for reading out of pixel values for the brightness or color at the calculated position of each of the areas; and
computer-executable instructions for converting information of the brightness or color read out in reading out of pixel values into binary or higher-valued information;
wherein a height or width of each of the areas is at least twice a width of the outer frame.

10. An information processing apparatus for detecting two-dimensional code having an outer frame region and an information region having a plurality of areas, from a captured image, and acquiring information represented by the information region, the information processing apparatus comprising:
an input unit configured to acquire captured image data representing the captured image;
a detecting unit configured to detect a region having a shape corresponding to the geometric shape of the two-dimensional code, from the captured image data;
a calculating unit configured to calculate a position in the captured image for each of the plurality of areas based on the detected region; and
an information acquisition unit configured to acquire image information of the plurality of areas within the region detected based on the calculated positions;
wherein, a height or width of each of the areas is at least twice a width of the outer frame.

11. An information processing apparatus for detecting two-dimensional code which can be distinguished from a background by brightness or color, the two dimensional code having an outer frame region defined by an external shape and an interior region having a plurality of areas, information of the areas being represented by brightness or color of the areas, the information processing apparatus comprising:
an input unit configured to acquire captured image data representing a captured image;
a detecting unit configured to detect a polygonal shape of the external shape of the two-dimensional code based on brightness or color, from the captured image data;
a calculating unit configured to calculate a position in the captured image for each of the plurality of areas based on the detected polygonal shape;
a reading unit configured to read out of pixel values for the brightness or color at the calculated position of each of the areas; and
a converting unit configured to convert information of the brightness or color read out in reading out of pixel values into binary or higher-valued information;
wherein a height or width of each of the areas is at least twice a width of the outer frame.

* * * * *